(12) United States Patent
Atawia

(10) Patent No.: US 12,446,011 B2
(45) Date of Patent: Oct. 14, 2025

(54) NETWORK RESOURCE ALLOCATION FOR ENERGY-CONSTRAINED DEVICES

(71) Applicant: Dell Products, L.P., Round Rock, TX (US)

(72) Inventor: Ramy Atawia, Kanata (CA)

(73) Assignee: DELL PRODUCTS, L.P., Round Rock, TX (US)

( * ) Notice: Subject to any disclaimer, the term of this patent is extended or adjusted under 35 U.S.C. 154(b) by 548 days.

(21) Appl. No.: 18/052,617

(22) Filed: Nov. 4, 2022

(65) Prior Publication Data

US 2024/0155571 A1 May 9, 2024

(51) Int. Cl.
*H04W 72/0446* (2023.01)
*H04W 72/56* (2023.01)
*H04W 76/28* (2018.01)

(52) U.S. Cl.
CPC ....... *H04W 72/0446* (2013.01); *H04W 72/56* (2023.01); *H04W 76/28* (2018.02)

(58) Field of Classification Search
CPC .. H04W 72/0446; H04W 72/56; H04W 76/28
See application file for complete search history.

(56) References Cited

U.S. PATENT DOCUMENTS

| | | | |
|---|---|---|---|
| 2021/0059004 A1* | 2/2021 | Wu | H04W 72/569 |
| 2021/0068053 A1* | 3/2021 | Nam | H04W 52/0229 |
| 2022/0070965 A1* | 3/2022 | Li | H04W 76/28 |
| 2022/0295514 A1* | 9/2022 | Shin | H04W 52/0216 |
| 2023/0050074 A1* | 2/2023 | Yu | H04W 76/14 |
| 2023/0403681 A1* | 12/2023 | Wen | H04W 52/0216 |

FOREIGN PATENT DOCUMENTS

| | | |
|---|---|---|
| EP | 4 236 477 A1 | 8/2023 |
| WO | 2021/163527 A1 | 8/2021 |
| WO | 2022/083769 A1 | 4/2022 |
| WO | 2023/173059 A1 | 9/2023 |

OTHER PUBLICATIONS

International Search Report and Written Opinion received for PCT Application Serial No. PCT/US2023/034359 dated Jan. 19, 2024, 19 pages.
Notification Concerning Transmittal of International Preliminary Report on Patentability mailed May 15, 2025 for PCT Application No. PCT/US2023/034359, 13 pages.
European Office Action for European Patent Application No. 23794533.2 mailed Jun. 12, 2025, 3 pages.

\* cited by examiner

*Primary Examiner* — Rina C Pancholi
(74) *Attorney, Agent, or Firm* — Amin, Turocy & Watson, LLP

(57) ABSTRACT

The described technology is generally directed towards network resource allocation for energy constrained devices. Energy constrained devices can use shortened discontinuous reception (DRX) intervals to reduce their energy consumption. In order to provide adequate quality of service (QoS) to energy constrained devices using shortened DRX intervals, a network controller can use the disclosed techniques to greedily allocate available transmission time slots to devices using shortened DRX intervals. The network controller can also apply the disclosed techniques to balance demands of other devices by allocating some transmission time slots to the other devices.

20 Claims, 12 Drawing Sheets

NETWORK RESOURCE ALLOCATION FOR ENERGY-CONSTRAINED DEVICES

TECHNICAL FIELD

The subject application generally relates to cellular networks, for example, to allocating transmission time slots to user equipment connected to a cellular network, and related embodiments.

BACKGROUND

Fifth generation (5G) and subsequent generation cellular networks support faster data delivery to an increasing variety of user equipment (UE) devices. Certain UEs are both data hungry and energy constrained. For example, automated guided vehicles (AGVs), also referred to as aerial, terrestrial, or aquatic drones, may be equipped with data hungry applications, e.g., applications that capture and transmit real-time surveillance video. Meanwhile, such UEs may also have weight and size constraints which limit their available battery capacity and corresponding available energy.

AGVs and other data hungry, energy constrained UEs can benefit from improved techniques to reduce energy consumption associated with their network transmissions, especially if such energy saving techniques can maintain sufficient quality of service (QoS) to support UE applications. Among other benefits, techniques to reduce energy consumption can increase the time intervals between battery recharges, thereby improving productivity of UEs and associated enterprises.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
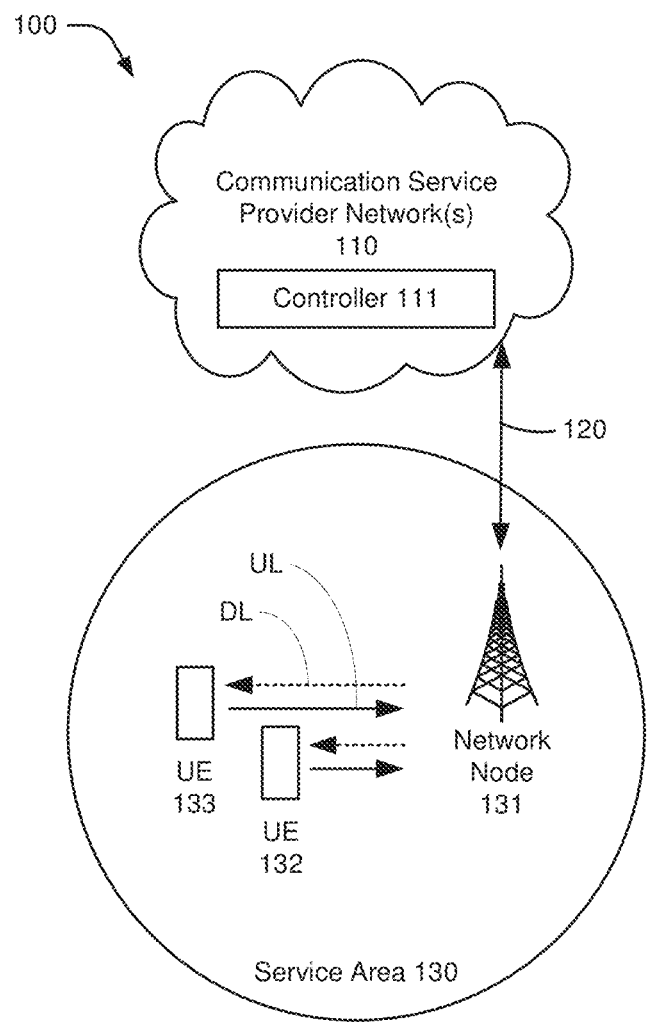
FIG. 1 illustrates an example wireless communication system, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed towards network resource allocation for energy constrained devices. Energy constrained devices can use shortened discontinuous reception (DRX) intervals to reduce their energy consumption. In order to provide adequate quality of service (QoS) to energy constrained devices using shortened DRX intervals, a network controller can greedily allocate available transmission time slots to devices using shortened DRX intervals. The network controller can also balance demands of other devices by allocating some transmission time slots to the other devices. Further aspects and embodiments of this disclosure are described in detail below.

FIG. 1 illustrates an example wireless communication system, in accordance with one or more embodiments described herein. The example wireless communication system 100 comprises communication service provider network(s) 110 comprising a controller 111, a network node 131, and user equipment (UEs) 132, 133. A backhaul link 120 connects the communication service provider network(s) 110 and the network node 131. The network node 131 can communicate with UEs 132, 133 within its service area 130. The dashed arrow lines from the network node 131 to the UEs 132, 133 represent downlink (DL) communications to the UEs 132, 133. The solid arrow lines from the UEs 132, 133 to the network node 131 represent uplink (UL) communications.

In general, with reference to FIG. 1, the non-limiting term "user equipment" can refer to any type of device that can communicate with network node 131 in a cellular or mobile communication system 100. UEs 132, 133 can have one or more antenna panels having vertical and horizontal elements. Examples of UEs 132, 133 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 132, 133 can also comprise IOT devices that communicate wirelessly.

In various embodiments, system 100 comprises communication service provider network(s) 110 serviced by one or more wireless communication network providers. Communication service provider network(s) 110 can comprise a "core network". In example embodiments, UEs 132, 133 can be communicatively coupled to the communication service provider network(s) 110 via a network node 131. The communication service provider network(s) 110, e.g., the controller 111, can provide settings, parameters, and other control information to the network node 131, which can configure the network node 131 communications with the UEs 132, 133. In some embodiments, the controller 111 can comprise a RAN intelligent controller (RIC), which can be adapted to perform the functions described herein.

The network node 131 can communicate with UEs 132, 133, thus providing connectivity between the UEs 132, 133 and the wider cellular network. The UEs 132, 133 can send transmission type recommendation data to the network node 131. The transmission type recommendation data can comprise a recommendation to transmit data via a closed loop multiple input multiple output (MIMO) mode and/or a rank-1 precoder mode.

Network node 131 can have a cabinet and other protected enclosures, computing devices, an antenna mast, and multiple antennas for performing various transmission operations (e.g., MIMO operations) and for directing/steering signal beams. Network node 131 can comprise one or more base station devices which implement features of the network node. Network nodes can serve several cells, depending on the configuration and type of antenna. In example embodiments, UEs 132, 133 can send and/or receive communication data via wireless links to the network node 131.

Communication service provider networks 110 can facilitate providing wireless communication services to UEs 132, 133 via the network node 131 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network node 131 can be connected to the one or more communication service provider networks 110 via one or more backhaul links 120. The one or more backhaul links 120 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 120 can also comprise wireless link components, such as but not limited to, line-of-sight (LOS) or non-LOS links which can comprise terrestrial air-interfaces or deep space links (e.g., satellite communication links for navigation). Backhaul links 120 can be implemented via a "transport network" in some embodiments. In another embodiment, network node 131 can be part of an integrated access and backhaul network. This may allow easier deployment of a dense network of self-backhauled 5G cells in a more integrated manner by building upon many of the control and data channels/procedures defined for providing access to UEs 132, 133.

Wireless communication system 100 can employ various cellular systems, technologies, and modulation modes to facilitate wireless radio communications between devices (e.g., the UEs 132, 133 and the network node 131). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 132, 133 and the network node 131) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
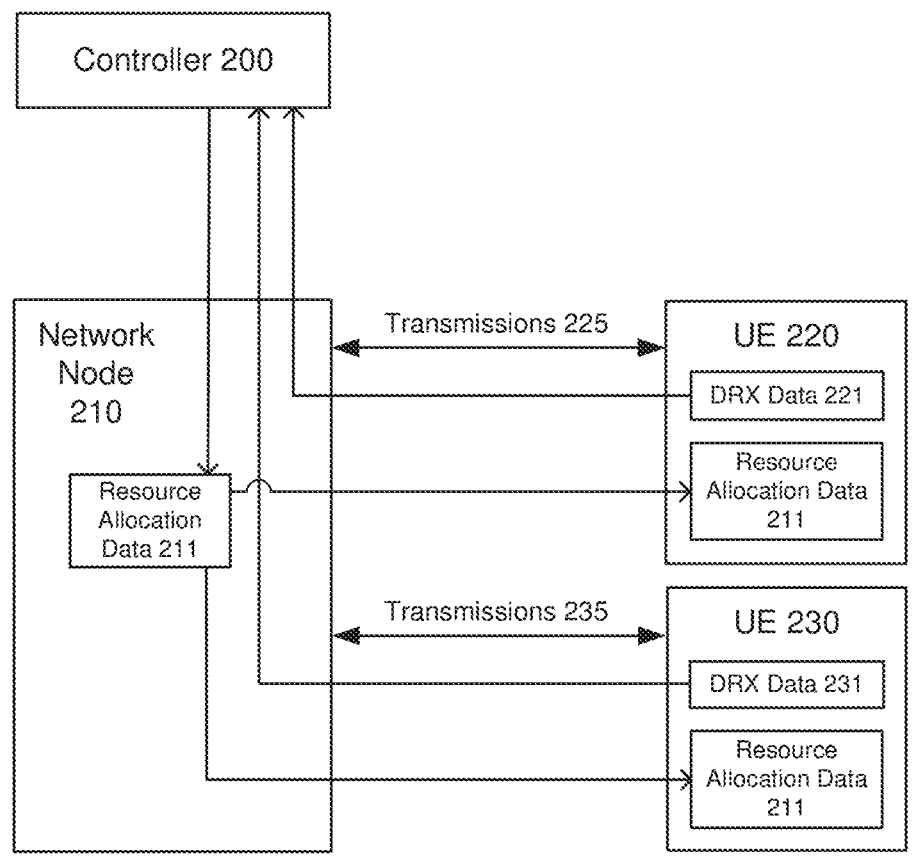
FIG. 2 illustrates example interactions between a controller, a network node, and UEs, in accordance with one or more embodiments described herein.

FIG. 2 illustrates example interactions between a controller, a network node, and UEs, in accordance with one or more embodiments described herein. FIG. 2 includes a controller 200, a network node 210, and UEs 220, 230. The controller 200 can implement the controller 111 introduced in FIG. 1, the network node 210 can implement the network node 131 introduced in FIG. 1, and the UEs 220, 230 can implement the UEs 132, 133 introduced in FIG. 1.

The UE 220 comprises DRX data 221, and the DRX data 221 can be provided to the controller 200 via the network node 210. Similarly, the UE 230 comprises DRX data 231, and the DRX data 231 can be provided to the controller 200 via the network node 210.

The controller 200 can process the DRX data 221, 231, along with other data described herein, to generate resource allocation data 211. The controller 200 can provide the resource allocation data 211 to the network node 210, and the network node 210 can optionally provide the resource allocation data 211 to the UEs 220, 230.

The network node 210 can use the resource allocation data 211 to allocate resources, such as transmission time slots, to the UEs 220, 230. Resources allocated to the UE 220 can be used in connection with UE 220 transmissions 225, and resources allocated to the UE 230 can be used in connection with UE 230 transmissions 235. The transmissions 225 can comprise, e.g., calls, texts, and data sent between the network node 210 and the UE 220. Similarly, the transmissions 235 can comprise, e.g., calls, texts, and data sent between the network node 210 and the UE 230.

The UEs 220, 230 can also use the resource allocation data 211. The UE 220 can use the resources allocated to the UE 220 via resource allocation data 211, in connection with UE 220 transmissions 225, and the UE 230 can use the resources allocated to the UE 230 via resource allocation data 211 in connection with UE 230 transmissions 235.

Figure 3:
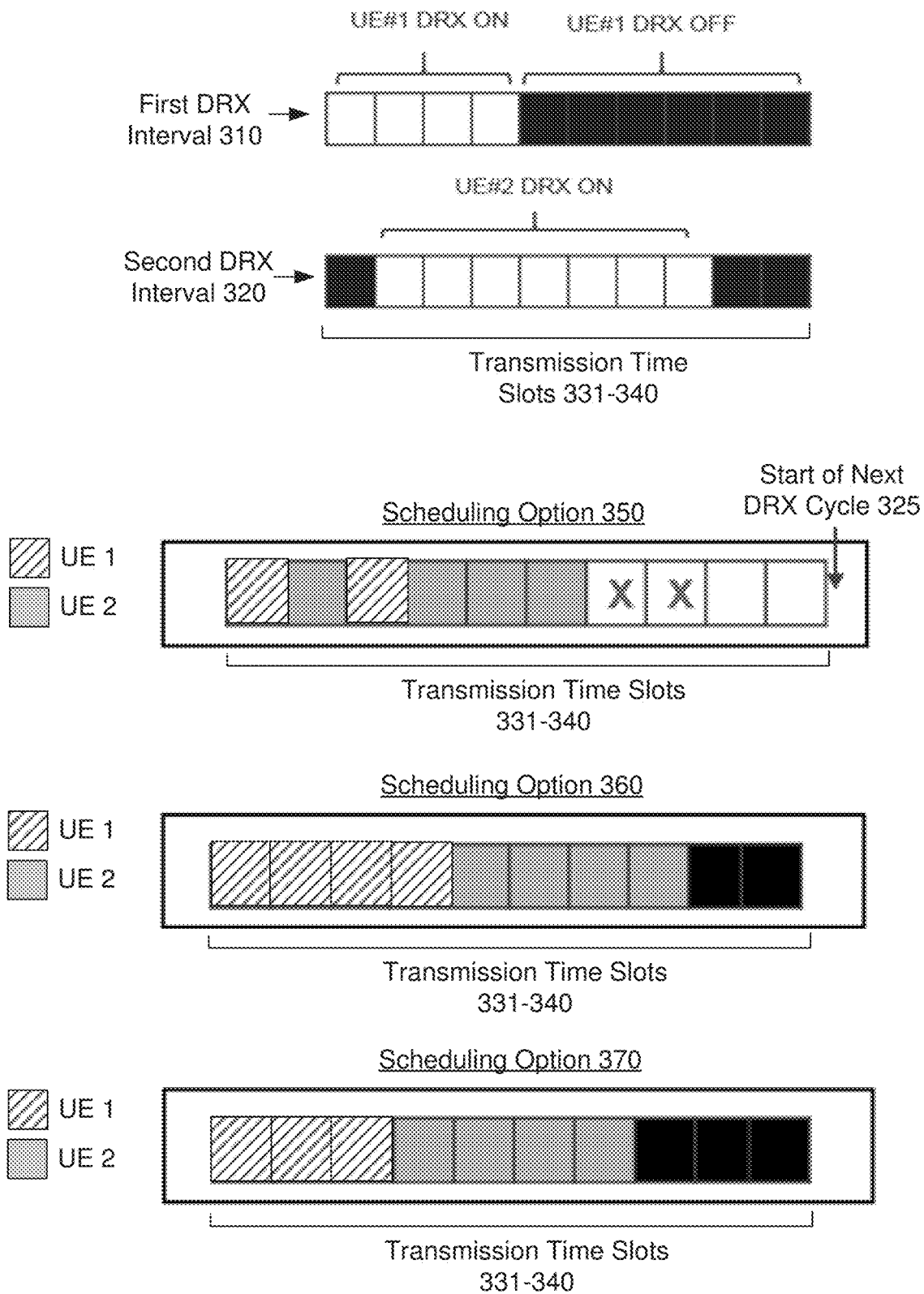
FIG. 3 illustrates example different discontinuous reception (DRX) intervals used by different UEs, and scheduling options which can be used to allocate resources to the different UEs, in accordance with one or more embodiments described herein.

FIG. 3 illustrates example different discontinuous reception (DRX) intervals used by different UEs, and scheduling options which can be used to allocate resources to the different UEs, in accordance with one or more embodiments described herein. FIG. 3 includes a first DRX interval 310 used by a first UE, referred to as UE 1, and a second DRX interval 320 used by a second UE, referred to as UE 2. FIG. 3 furthermore includes example scheduling options 350, 360, and 370.

The first UE (UE 1) can implement, e.g., the UE 220 introduced in FIG. 2, and the first DRX interval 310 can represent DRX data 221. The second UE (UE 2) can implement, e.g., the UE 230 introduced in FIG. 2, and the second DRX interval 320 can represent DRX data 231. The example scheduling options 350, 360, and 370 can represent different versions of resource allocation data 211 which may be output by the controller 200 as a function of the DRX data 221, 231.

The first and second DRX intervals 310, 320 include different numbers of transmission time slots 331-340 during which the respective UEs (UE 1 and UE 2) can transmit data. The DRX interval 310 includes four of the time slots 331-340 during which the UE 1 can transmit, and the DRX interval 320 includes seven of the time slots 331-340 during which the UE 2 can transmit. Furthermore, there is an overlap of three of the time slots 331-340 during which both UE 1 and UE 2 can transmit. A UE such as UE 1 that has limited energy resources may use a shorter DRX interval, such as first DRX interval 310, as a technique to conserve energy associated with UE 1 transmissions. A UE such as UE 2 that is not energy constrained may use a longer DRX interval, such as second DRX interval 320.

Each of the scheduling options 350, 360, and 370 allocates some of the transmission time slots 331-340 to UE 1, and others of the transmission time slots 331-340 to UE 2. A network node 210 and a UE 220 or 230 can apply a scheduling option 350, 360, or 370 by conducting uplink or downlink transmissions during transmission time slots allocated to the UE 220 or 230. Transmissions may be performed in repeating DRX cycles, and each DRX cycle can be followed by a start of a next DRX cycle 325.

In an aspect, this disclosure includes a QoS fair resource allocation for use in connection with energy constrained ultra-reliable low latency communications (URLLC) devices. Methods according to this disclosure can leverage UE DRX configurations, and can greedily allocate consecutive transmission time slots 331-340 to a same UE, e.g., to UE 1, to proactively transmit UE 1's data and allow UE 1 to go into sleep mode in order to save energy/battery life.

While performing energy-efficient resource allocation, methods provided herein can also calculate a risk of violating the QoS of other unscheduled devices such as UE 2, which may have longer battery lifetimes or otherwise less urgent energy constraints. DRX interval data 310, 320 can be supplemented by reported buffer statuses, packet delay budgets, and channel conditions, and other key performance indicators (KPIs) which can be used by controller 200 to determine a scheduling option which strikes a balance between long-term fair resource distribution among connected devices (such as UE 1 and UE 2) and the energy-saving gains of battery constrained devices such as UE 1. Embodiments of this disclosure can enhance existing approaches of fair resource allocation, such as round robin, which overlook the varying battery capabilities or other energy constraints among UEs, resulting in increased service downtime when constrained UEs, such as UE 1, are taken out of service for recharging.

In some embodiments, the techniques disclosed herein can be applied in private 5G networks, although other networks can also benefit from the techniques disclosed herein. In a private 5G network environment, network equipment comprising the controller 200, the network node 210, and the UEs 220, 230 can comprise private 5G network equipment.

Private 5G networks can comprise data hungry applications at energy constrained UEs, such as AGVs adapted to perform real-time video surveillance. As the demand for higher quality videos increases, e.g., for ultra-high definition (UHD), three dimensional (3D), or virtual reality (VR) applications, a larger amount of data is transmitted from each UE uplink, which demands more air interface resources. Such high resource demands further increase during high load scenarios, in which a UE may monitor the spectrum of a serving cell but may be granted less air interface resources which decrease the UE's energy efficiency.

The above described factors can increase UE energy consumption, decrease the talk-time of UEs such as AGVs, and oblige operators to take UEs out of service to be recharged, which can impact enterprise productivity. To that end, resource allocation techniques such as those disclosed herein can reduce or minimize UE energy consumption while achieving fair QoS satisfaction among UEs.

3GPP protocols rely on DRX, which allows UEs to go into sleep mode (DRX OFF state) and periodically wake up (DRX ON state) to check for transmissions granted by a serving cell. Wireless scheduling techniques such as fair resource distribution have inherited a round robin approach from computer networks. Round robin down-prioritizes a last scheduled UE and picks a least frequently scheduled UE for each time slot. Although round robin can achieve resource fairness, low energy efficiency can result for UEs with short DRX on durations due to a small number of slots allocated. In addition, the arrival of a data burst during a DRX OFF duration can increase the risk of QoS violations and not meeting a packet delay budget for energy constrained UEs adopting short DRX ON durations. Mobile operators also tend to configure different DRX profiles to reflect the device capabilities and services, and thus round-robin based fair resource distribution can be suboptimal for energy constrained UEs.

Embodiments of this disclosure can improve upon round-robin type resource allocation approaches by applying fair uplink data scheduling that greedily allocates resources to energy-constrained UEs during their DRX ON duration for consecutive time slots, while looking ahead at future time slots to ensure QoS satisfaction for unscheduled UEs.

Embodiments can apply DRX duration aware scheduling, which can proactively increase or maximize an allocation of resources to a UE, e.g., to UE 1, during its DRX ON duration, in order to increase the energy efficiency of UE 1, and to reduce or minimize the risk of delay violations when a packet deadline aligns with a DRX OFF state of the UE 1. Such approaches improve on existing approaches that perform resource allocation in a round robin fashion between the UEs on a time slot basis, and thus a UE might be allocated during a small portion of its DRX ON duration, forcing the UE to stay up and consuming more energy while waiting to be granted more resources.

Embodiments can furthermore be configured to achieve long-term QoS fairness for connected UEs. Embodiments can look ahead to check the risk of violating QoS fairness for unscheduled UEs, such as UE 2, due to the greedy allocation to UE 1. Hence, UEs at high risk of QoS violations can be prioritized alongside UEs with energy constraints. This can be achieved through building multiple scenarios, each scenario including multi-stage time slot allocations, and methods can pick a scenario that reduces or minimizes a total energy used by an energy constrained UE 1 over future slots, without violating QoS levels of other UEs such as UE 2. Such approaches can improve on approaches that may consider a very next time slot to decide on a highest priority UE and grant all resources to that UE, even if such a grant of all resources violates a packet delay budget for an energy-constrained UE with a long DRX off duration.

UEs with different DRX configurations, such as UE 1 and UE 2, can have different DRX ON durations as well as different slot indices indicative of transmission time slots 331-340 included in the DRX ON durations. UE 1 is energy constrained and thus has a shorter DRX ON duration than UE 2.

Scheduling option 350 is a result of a round robin resource distribution between UE 1 and UE 2. Scheduling option 350 results in 50% energy efficiency (2 out of 4 transmission time slots 331-340) for UE 1. UE 1 may need two additional transmission time slots 331-340 to satisfy UE 1's demand. The additional transmission time slots 331-340 can be granted to UE 1 in the next DRX cycle 325, after seven transmission time slots 331-340, resulting in extra delay of UE 1 traffic.

Scheduling option 360 is a result of prioritizing UE 1 during its DRX ON duration of four consecutive transmission time slots, according to an embodiment of this disclosure. Scheduling option 360 increases energy efficiency of UE 1, and satisfies the QoS of the energy constrained UE 1 with a short DRX ON duration.

Scheduling option 370 is a result of further enhancing scheduling option 360, to account for potential delay to other UEs (i.e., UE 2). If deferring transmission time slot allocations to UE 2 according to scheduling option 360 will not violate UE 2's packet delay budget, then scheduling option 360 can be used. However, if deferring transmission time slot allocations to UE 2 according to scheduling option 360 will violate UE 2's packet delay budget then scheduling option 370 can be precomputed to prevent such violations.

Scheduling option 370 represents a reduction of the transmission time slots reserved for UE 1, wherein UE 1 is allocated, e.g., a reduced number of transmission time slots (three transmission time slots in this example), thereby preventing the greedy energy-saving allocation to UE 1 according to scheduling option 360 from violating the packet delay budget of other UEs such as UE 2.

Figure 4:
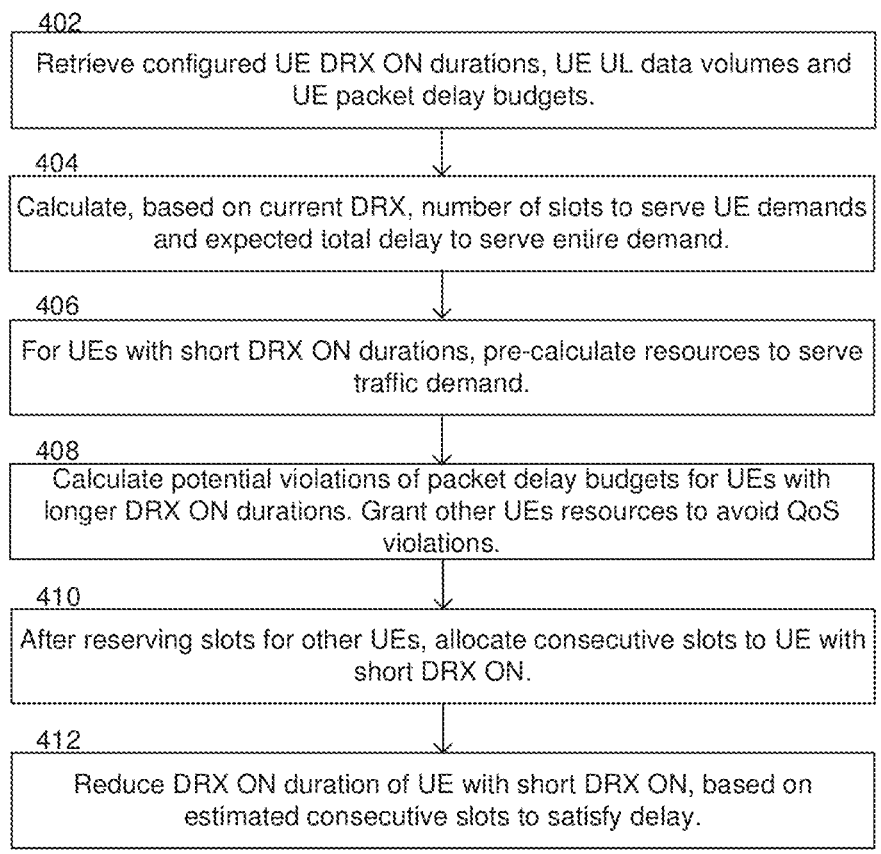
FIG. 4 is a flow diagram illustrating example operations that can be performed by a controller, in accordance with one or more embodiments described herein.

FIG. 4 is a flow diagram illustrating example operations that can be performed by a controller, in accordance with one or more embodiments described herein. The operations illustrated in FIG. 4 can be performed, e.g., by a controller 200 such as illustrated in FIG. 2, in order to produce resource allocation data 211 that represents a scheduling option such as scheduling option 360 or scheduling option 370.

At 402, the controller 200 can retrieve the configured DRX ON durations for each UE. The controller 200 can furthermore retrieve demanded UL data volumes and the packet delay budgets for each UE. At 404, the controller 200 can calculate the number of slots required to serve the demand of each UE, and the expected total delay to serve the entire demand, based on current DRX configurations. At 406, for UEs with short DRX ON durations, the controller 200 can pre-calculate an amount of resources (e.g., transmission time slots) to serve the UE's demanded traffic. At 408, the controller 200 can calculate potential violations of packet delay budgets for other UEs (with long DRX ON durations). These other UEs can be granted minimal resources to avoid QoS violations. At 410, the controller 200 can allocate several consecutive transmission time slots to the UE with short DRX ON, after optionally reserving slots for other UEs. At 412, the controller 200 can minimize the DRX ON duration of a UE with short DRX ON, based on an estimated number of consecutive slots required to satisfy the UE's delay budget.

Figure 5:
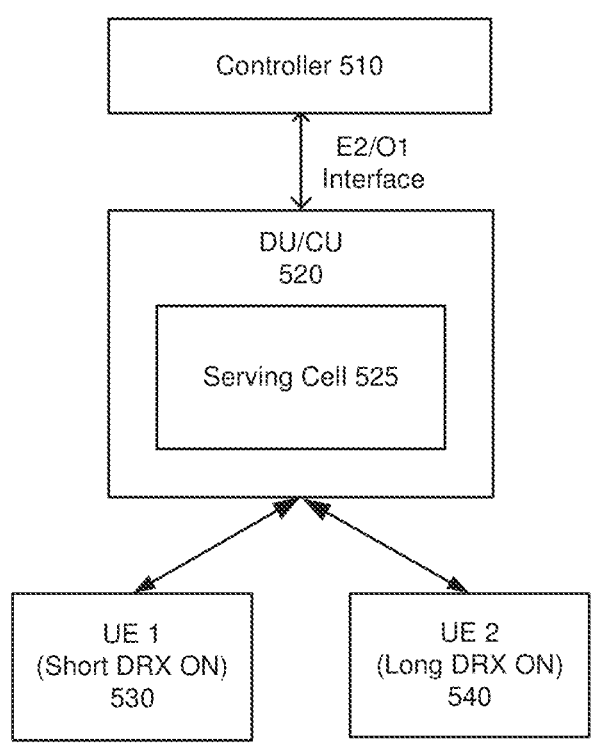
FIG. 5 illustrates an example system including a controller, a serving cell, and UEs, in accordance with one or more embodiments described herein.

In an embodiment, FIG. 4 illustrates operations of a controller 510 in a system such as illustrated in FIG. 5, to achieve fair resource allocation and energy saving for uplink delay sensitive applications at UEs 530, 540. At 402, UE configured DRX data can be retrieved by the controller 510 from a serving cell 525. The DRX data can contain, inter alia, DRX ON offset information including the time slot at which a UE 530, 540 switches from a DRX OFF to a DRX ON state and becomes available to receive uplink grants and send data. The DRX data can also contain DRX ON duration information that represents a total number of slots in which the UE 530, 540 stays in DRX ON state.

At 404, the controller 510 can estimate a number of slots and a corresponding total estimated delay to deliver uplink data to a UE 530. The controller 510 can use KPIs including, e.g., an uplink buffer size reported by a UE 530 over the air interface as part of the UE's 530 buffer status report (BSR); an uplink channel spectral efficiency calculated based on a selected modulation and coding scheme (MCS) for the UE 530; and/or a total available bandwidth for uplink, which can be retrieved by the controller 510 from a cell duplex configuration such as frequency division duplex (FDD) bandwidth, time division duplex (TDD) slot pattern, . . . etc.).

At 408, the controller 510 can retrieve packet delay budget information from a 5G QoS identifier (5QI) configuration, available from a 5G core network or from the serving cell 525. Further aspects of FIG. 4 can be understood by reference to FIG. 5 and FIG. 6.

FIG. 5 illustrates an example system including a controller, a serving cell, and UEs, in accordance with one or more embodiments described herein. FIG. 5 includes a controller 510, a distributed unit (DU)/central unit (CU) 520 comprising a serving cell 525, a UE 1 530 associated with a short DRX ON interval, and a UE 2 540 associated with a long DRX ON interval. The controller 510 is connected to the DU/CU 520 via an E2 or O1 interface.

In FIG. 5, the controller 510 can implement the controller 200 introduced in FIG. 2, the serving cell 525 can implement the network node 210 introduced in FIG. 2, and the UEs 530, 540 can implement the UEs 220, 230 introduced in FIG. 2. The controller 510 can comprise, e.g., a RIC, and the methods disclosed herein can optionally leverage open RAN (O-RAN) controllers such as a RIC, to collect DRX configuration information from the serving cell DU or CU 520. Collected data can be exchanged over O-RAN defined interfaces such as O1 and/or E2, or via an A1 type interface to the UEs 530, 540.

Figure 6:
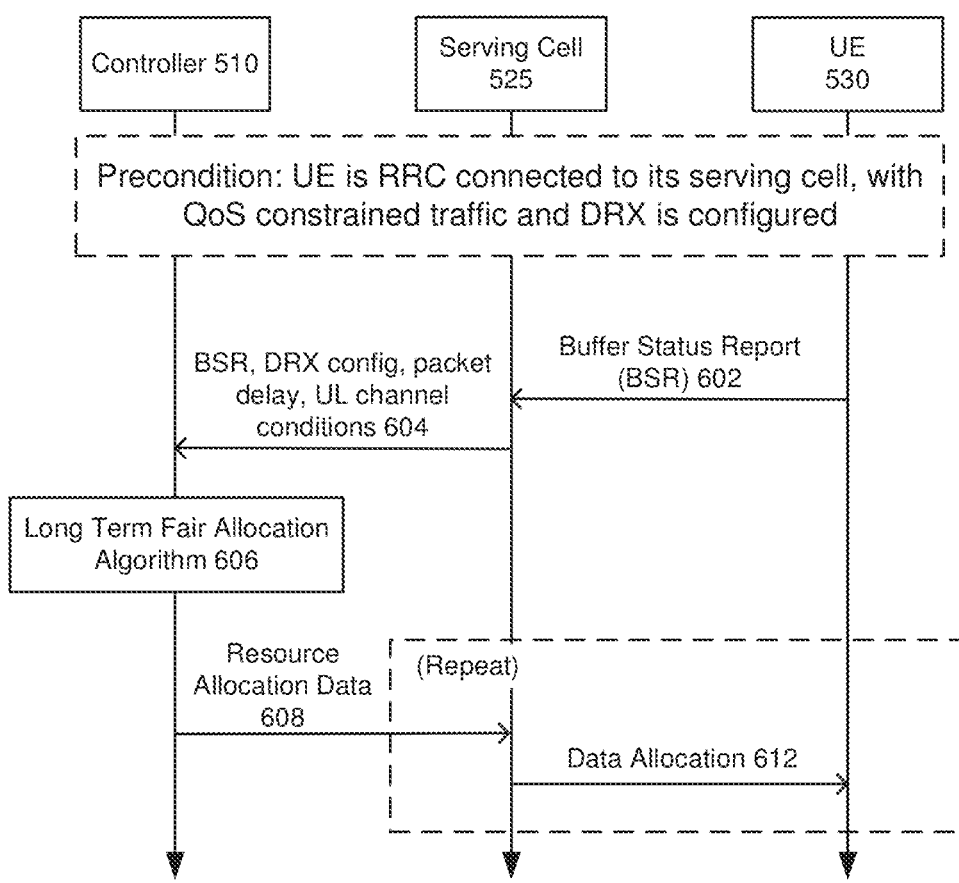
FIG. 6 illustrates example interactions between the controller, serving cell, and UEs introduced in FIG. 5, in accordance with one or more embodiments described herein.

FIG. 6 illustrates example interactions between the controller 510, serving cell 525, and UE 530 introduced in FIG. 5, in accordance with one or more embodiments described herein. FIG. 6 illustrates example signaling between the controller 510, serving cell 525, and UE 530. The arrows extending downward from each of the controller 510, serving cell 525, and UE 530 represent timelines, so that events occurring above occur before events occurring below.

As a precondition for performance of the illustrated operations, the UE 530 is radio resource control (RRC) connected to its serving cell 525, with QoS constrained traffic, and DRX is configured. At 602, the UE 530 can send a buffer status report (BSR) to the serving cell 525. At 604, the serving cell 525 can send the BSR to the controller 510 along with DRX configuration information pertaining to the UE 530, packet delay information pertaining to the UE 530, and UL channel conditions information pertaining to the UE 530. At 606, the controller 510 can optionally apply a long term fair allocation algorithm to the UE 530 which greedily allocates resources to the UE 530 while also allocating sufficient resources to other UEs, to satisfy the respective packet delay budgets of the UE 530 and the other UEs. At 608, the controller 510 can send resource allocation data 608 to the serving cell 525. The resource allocation data 608 can comprise an output of the long-term fair allocation algorithm and can comprise a number of consecutive transmission time slots allocated to UE 530, as well as allocations of other time slots to other UEs. At 612, the serving cell 525 can apply the resource allocation data 608 in transmissions involving the UE 530, for example by repetitively applying data allocation 612 to UE 530 transmissions.

Figure 7:
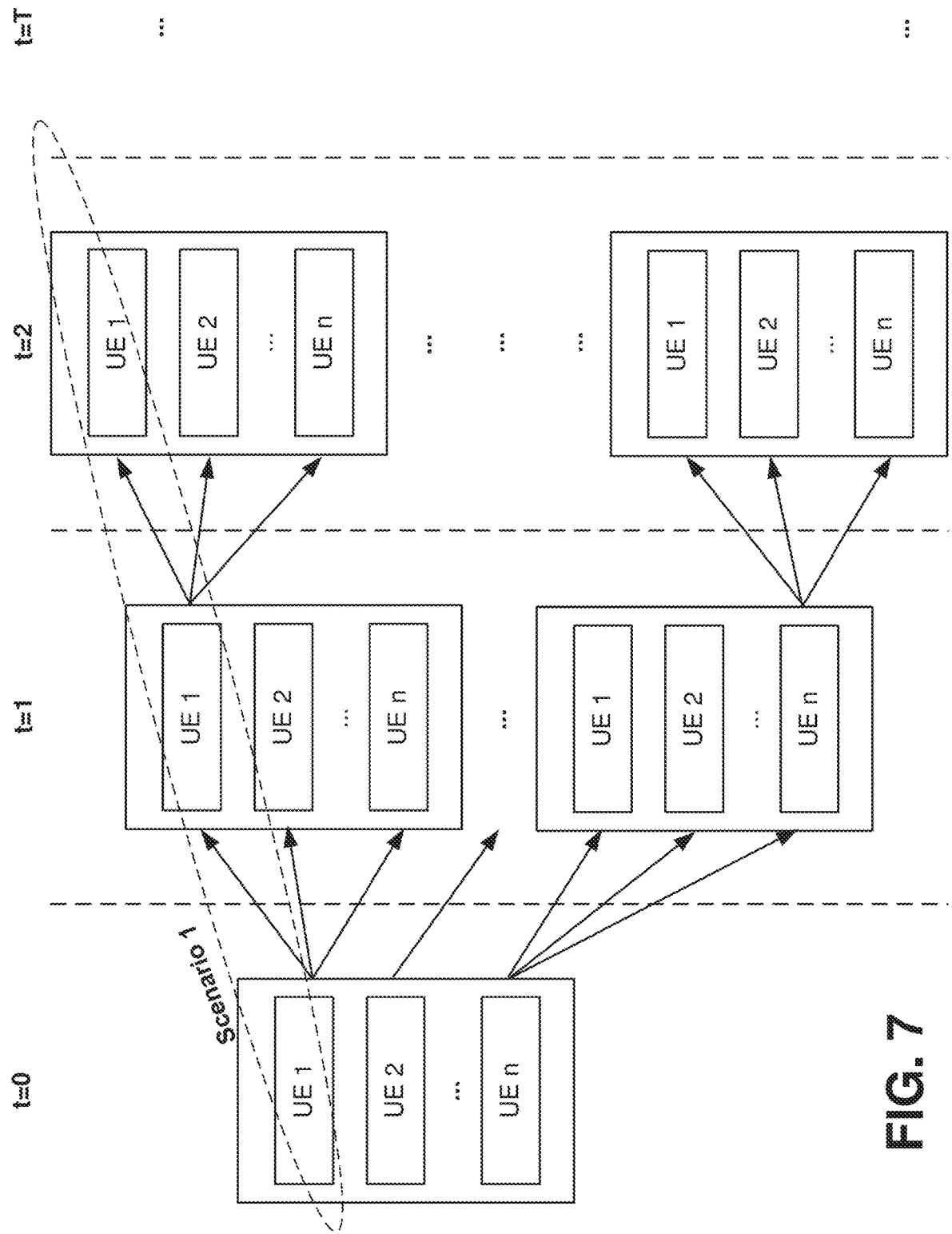
FIG. 7 illustrates example creation of different allocation scenarios that satisfy UE QoS while improving UE energy efficiency, in accordance with one or more embodiments described herein.

FIG. 7 illustrates example creation of different allocation scenarios that satisfy UE QoS while improving UE energy efficiency, in accordance with one or more embodiments described herein. FIG. 7 illustrates UEs including UE 1, UE 2, . . . UE n, at each of several consecutive time windows t=0, t=1, t=2, t=T. An example scenario 1 is indicated.

Embodiments according to FIG. 7 can leverage the predictability of user traffic and channels to derive long-term allocation policies. In the illustrated embodiment, a controller such as controller 510 can create different allocation scenarios for a window T that satisfies the QoS of multiple different UEs, while also increasing or maximizing UE energy-efficiency by increasing allocations during UE DRX ON durations, and achieving fair resource distribution between UEs. Each scenario can correspond to a series of possible UEs to time slot allocations, over an allocation window T which also considers UE buffer status and UE DRX ON states. The controller 510 can evaluate different scenarios, and the controller 510 can select a scenario for execution in a coming allocation window T.

For a scheduling window T, methods according to FIG. 7 can create different scheduling scenarios ($S_i$) for a UE to time slot allocation. $Si=[x_{j,t}]$, $\forall j,t$, and $x_{j,t}=1$, if UEj is scheduled in slot t and =0 otherwise. The controller 510 can then select a scenario that achieves long-term fairness using a min-max approach, achieves UE energy-efficiency, satisfies QoS for all UEs, and/or allows allocation in DRX ON states.

In an example, a scenario that achieves long-term fairness using a min-max approach can be determined as a scenario for which:

$$\min\left(\max\left(\sum_t x_{j,t}\right)\right)$$

A scenario that achieves UE energy-efficiency can be determined to be a scenario which minimizes the likelihood of a DRX ON duration with data in a UE buffer ($y_{j,t}=1$) and the corresponding UE is not scheduled:

$$\min\left(\frac{\sum_t y_{j,t}}{T - \sum_t x_{j,t}}\right)$$

A scenario that satisfies QoS for all UEs can be determined as a scenario which ensures time taken to transmit UL data is within a packet delay budget:

$$\left(\frac{\text{bufferize}}{BW_t \times SE_t}\right) \times x_{j,t} \times \text{slot duration} < t'$$

A scenario that allows allocation in DRX ON states can be determined as a scenario for which:

$$(z_{j,t}=1): x_{j,t} \leq z_{j,t}$$

Figure 8:
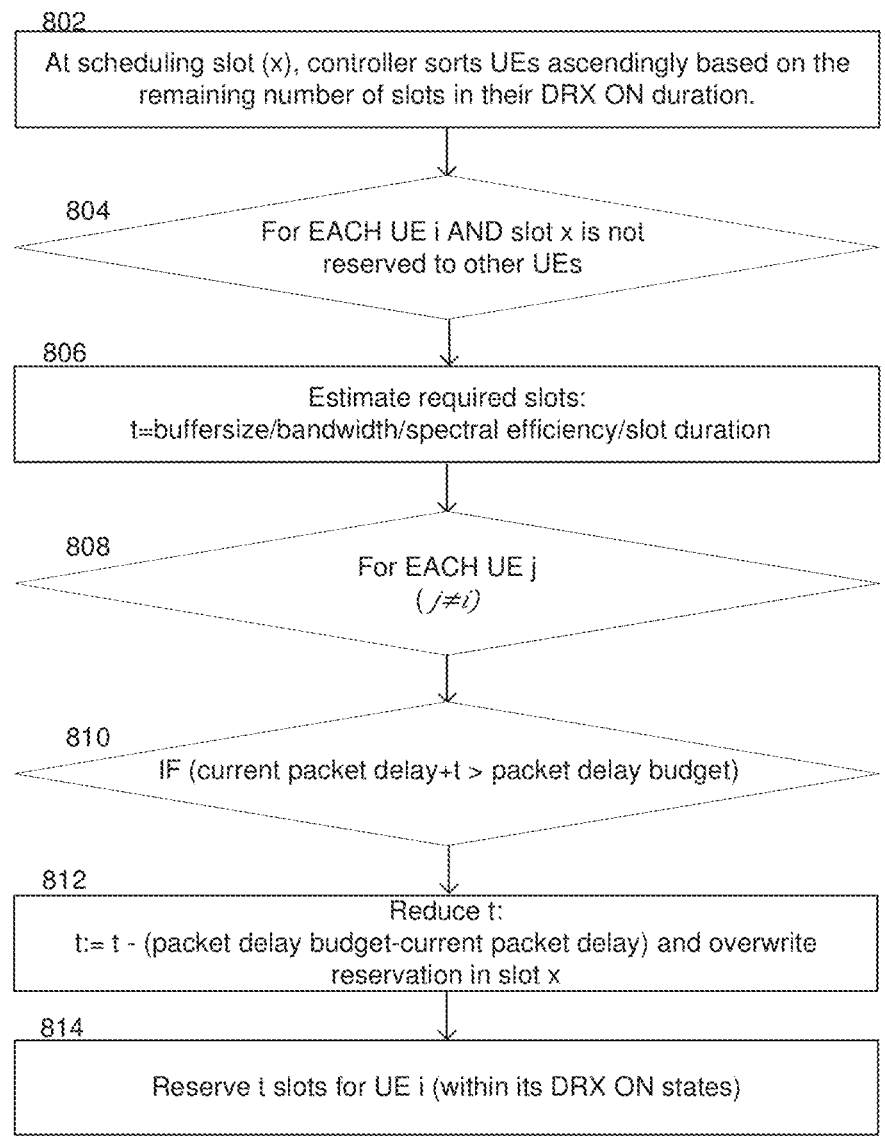
FIG. 8 is a flow diagram illustrating example operations of a fast response resource allocation technique for dynamic environments, in accordance with one or more embodiments described herein.

FIG. 8 is a flow diagram illustrating example operations of a fast response resource allocation technique for dynamic environments, in accordance with one or more embodiments described herein. FIG. 8 represents a different embodiment, different from embodiments according the FIG. 7, wherein embodiments according to FIG. 8 perform short term energy-saving fair allocations that might overwrite previous decisions to avoid QoS violations of sporadic, aperiodic user requests. Embodiments according to FIG. 8 can be performed for example when long-term allocation is subjected to high uncertainty such as the in the case of highly dynamic environments where UE traffic or channel conditions are time-varying (or aperiodic). Methods according to FIG. 8 can be executed at each transmission time interval (TTI) and can optionally overwrite previous pre-allocated slots for energy constrained UEs in the case of QoS violations for any other device. To achieve fair resource distribution, methods according to FIG. 8 can sort UEs using a combined utility of DRX on states and the total number of allocated slots over a last allocation window.

At 802, at a scheduling slot (x), the controller 510 can sort UEs ascendingly based on the remaining number of slots in their DRX ON duration. At 804, the controller 510 can initiate processing of each UE i for which slot x is not reserved to other UEs. At 806, the controller 510 can estimate required slots for UE i as t=buffersize/bandwidth/spectral efficiency/slot duration.

At 808, the controller 510 can initiate processing of each UEj (j≠i), that is, the UEs other than the UEs i. At 810, IF (current packet delay+t>packet delay budget) for a UE j, the controller 510 can proceed to 812. At 812, the controller 510 can reduce t subtracting (packet delay budget-current packet delay), and the controller 510 can overwrite a reservation in slot x. Finally, at 814, the controller 510 can reserve t slots for each UE i, wherein the t slots are reserved within a UE's DRX ON states.

Figure 9:
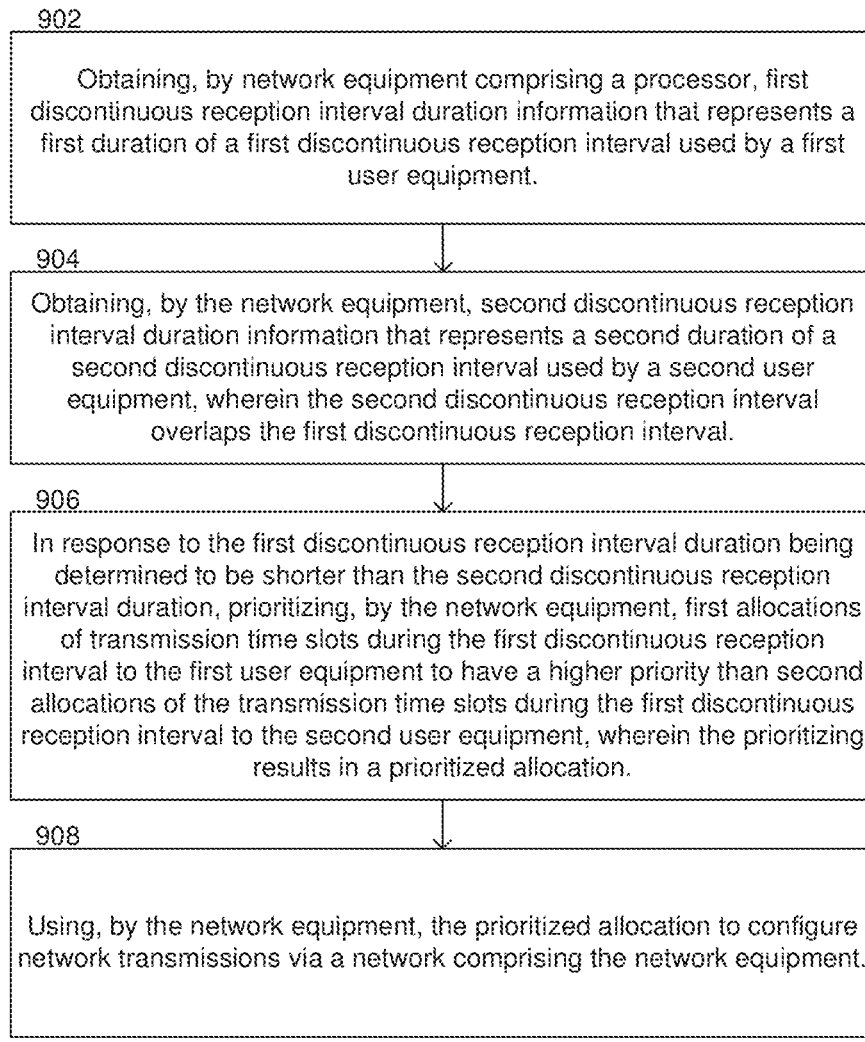
FIG. 9 is a flow diagram of a first example, non-limiting computer implemented method for allocating resources to UEs based on UE energy constraints as demonstrated by UE DRX intervals, in accordance with one or more embodiments described herein.

FIG. 9 is a flow diagram of a first example, non-limiting computer implemented method for allocating resources to UEs based on UE energy constraints as demonstrated by UE DRX intervals, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by a controller 200 such as illustrated in FIG. 2. Operation 902 comprises obtaining, by network equipment such as controller 200 comprising a processor, first discontinuous reception (DRX) interval duration information 221 that represents a first duration of a first discontinuous reception interval, e.g., first discontinuous reception interval 310, used by a first user equipment 220. Operation 904 comprises obtaining, by the network equipment 200, second discontinuous reception interval duration information 231 that represents a second duration of a second discontinuous reception interval, e.g., second discontinuous reception interval 320, used by a second user equipment 230, wherein the second discontinuous reception interval 320 overlaps the first discontinuous reception interval 310, e.g., as illustrated in FIG. 3.

Operation 906 comprises, in response to the first discontinuous reception interval 310 duration being determined to be shorter than the second discontinuous reception interval 320 duration, e.g., as illustrated in FIG. 3, prioritizing, by the network equipment 200, first allocations of transmission time slots 331-340 during the first discontinuous reception interval 310 to the first user equipment 220 to have a higher priority than second allocations of the transmission time slots 331-340 during the first discontinuous reception interval 310 to the second user equipment 230, wherein the prioritizing results in a prioritized allocation, e.g., as shown in scheduling options 360 and 370.

In some embodiments, the prioritized allocation determined at operation 906 can be based on other data in addition to the discontinuous reception interval information. For example, the prioritized allocation can be based on a data volume of data transmitted via the first user equipment 220. The data volume can be determined by the network equipment 200 based on an amount of data in a buffer used by the first user equipment 220. The data volume can comprise an uplink data volume of uplink data transmitted from the first user equipment 220 via the network. In some embodiments, the prioritized allocation determined at operation 906 can be based at least in part on channel spectral efficiency data representative of a channel spectral efficiency associated with the first user equipment 220.

The prioritized allocation determined at operation 906 can optionally allocate all of the transmission time slots 331-340 during the first discontinuous reception interval 310 to the first user equipment 220, e.g., as illustrated in scheduling option 360. Alternatively, the prioritized allocation can comprise a reduced allocation of the transmission time slots 331-340 during the first discontinuous reception interval 310 to the first user equipment 220, wherein the reduced allocation can be reduced based on a packet delay budget associated with the second user equipment 230, e.g., as illustrated in scheduling option 370.

Operation 908 comprises using, by the network equipment 200, the prioritized allocation determined at operation 906 to configure network transmissions via a network comprising the network equipment 200. For example, the network equipment 200 can send resource allocation data 211 to the network node 210 so that network node 210 can configure the network transmissions 225, 235.

Figure 10:
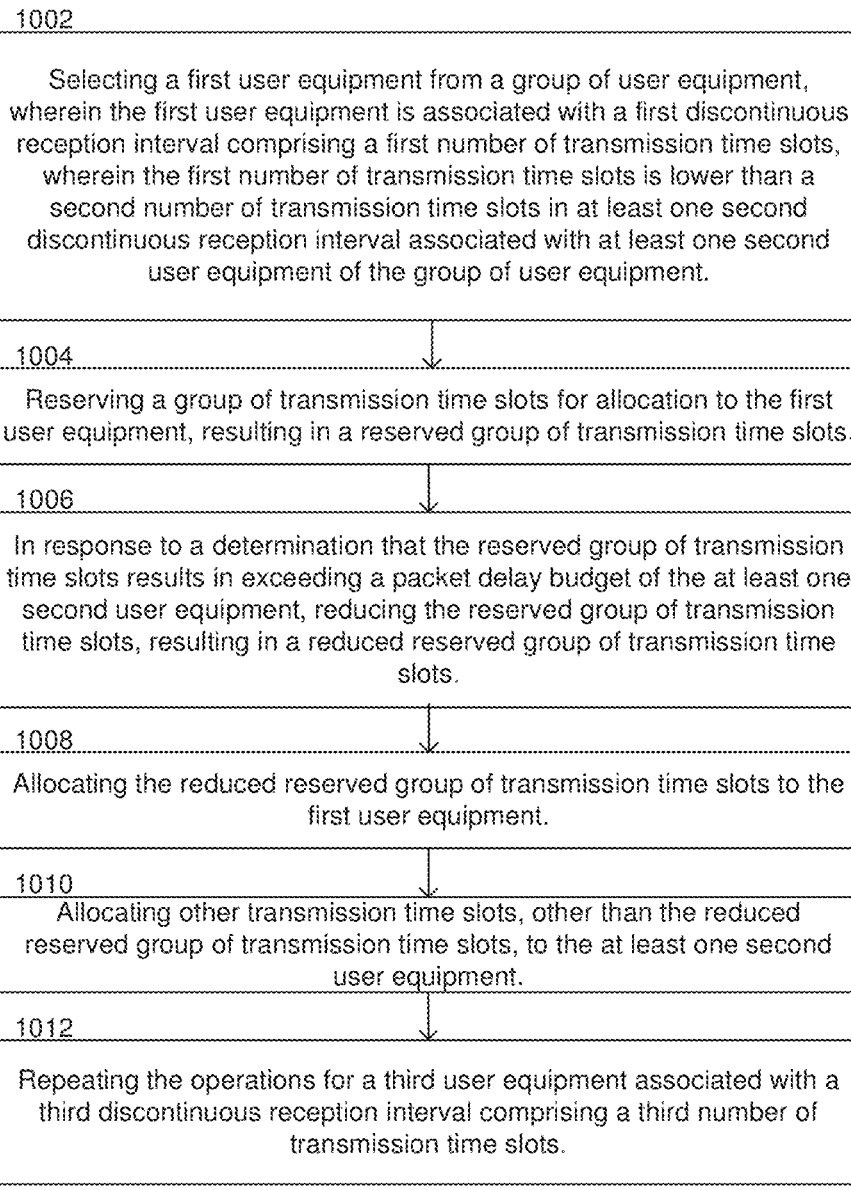
FIG. 10 is a flow diagram of a second example, non-limiting computer implemented method for allocating resources to UEs based on UE energy constraints as demonstrated by UE DRX intervals, in accordance with one or more embodiments described herein.

FIG. 10 is a flow diagram of a second example, non-limiting computer implemented method for allocating resources to UEs based on UE energy constraints as demonstrated by UE DRX intervals, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 10 can be performed by a controller 200 such as illustrated in FIG. 2, which can include, e.g., network equipment comprising a RAN intelligent controller (RIC). Operation 1002 comprises selecting a first user equipment 220 from a group of user equipment 220, 230, wherein the first user equipment 220 is associated with a first discontinuous reception interval 310 comprising a first number of transmission time slots 331-340, wherein the first number of transmission time slots 331-340 is lower than a second number of transmission time slots 331-340 in at least one second discontinuous reception interval 320 associated with at least one second user equipment 230 of the group of user equipment 220, 230. In some embodiments, the first discontinuous reception interval 310 can comprise an uplink discontinuous reception interval. In other embodiments, the first discontinuous reception interval 310 can comprise a downlink discontinuous reception interval.

Operation 1004 comprises reserving a group of transmission time slots 331-340 for allocation to the first user equipment 220, resulting in a reserved group of transmission time slots. For example, the reserved group of transmission time slots can be the group allocated to UE 220 according to scheduling option 360. A size of the reserved group of the transmission time slots can optionally be based on a buffer size of a buffer associated with the first user equipment 220, a channel spectral efficiency associated with a modulation and coding scheme (MCS) used by the first user equipment 220, and/or total available bandwidth associated with transmissions between the first user equipment 220 and at least one network device, e.g., network node 210, of a network comprising the network equipment 200.

Operation 1006 comprises, in response to a determination that the reserved group of transmission time slots (reserved pursuant to operation 1004) results in exceeding a packet delay budget of the at least one second user equipment 230, reducing the reserved group of transmission time slots, resulting in a reduced reserved group of transmission time slots. For example, the reduced reserved group of transmission time slots can be the group allocated to UE 220 according to scheduling option 370.

Operation 1008 comprises allocating the reduced reserved group of transmission time slots to the first user equipment 220, and operation 1010 comprises allocating other transmission time slots, other than the reduced reserved group of transmission time slots, to the at least one second user equipment 220.

Operation 1012 comprises repeating the operations 1002-1010 for a third user equipment associated with a third discontinuous reception interval comprising a third number of transmission time slots. For example, if a third user equipment is included in FIG. 2, then operation 1002 can be repeated by selecting the third user equipment from the group of user equipment including 220, 230, and the third ser equipment, wherein the third user equipment is associated with a third discontinuous reception interval 310 comprising a third number of transmission time slots 331-340, wherein the third number of transmission time slots 331-340 is lower than the second number of transmission time slots 331-340 in the at least one second discontinuous reception interval 320 associated with the at least one second user equipment 230 of the group of user equipment. The other operations 1004-1010 can likewise be repeated for the third user equipment.

Figure 11:
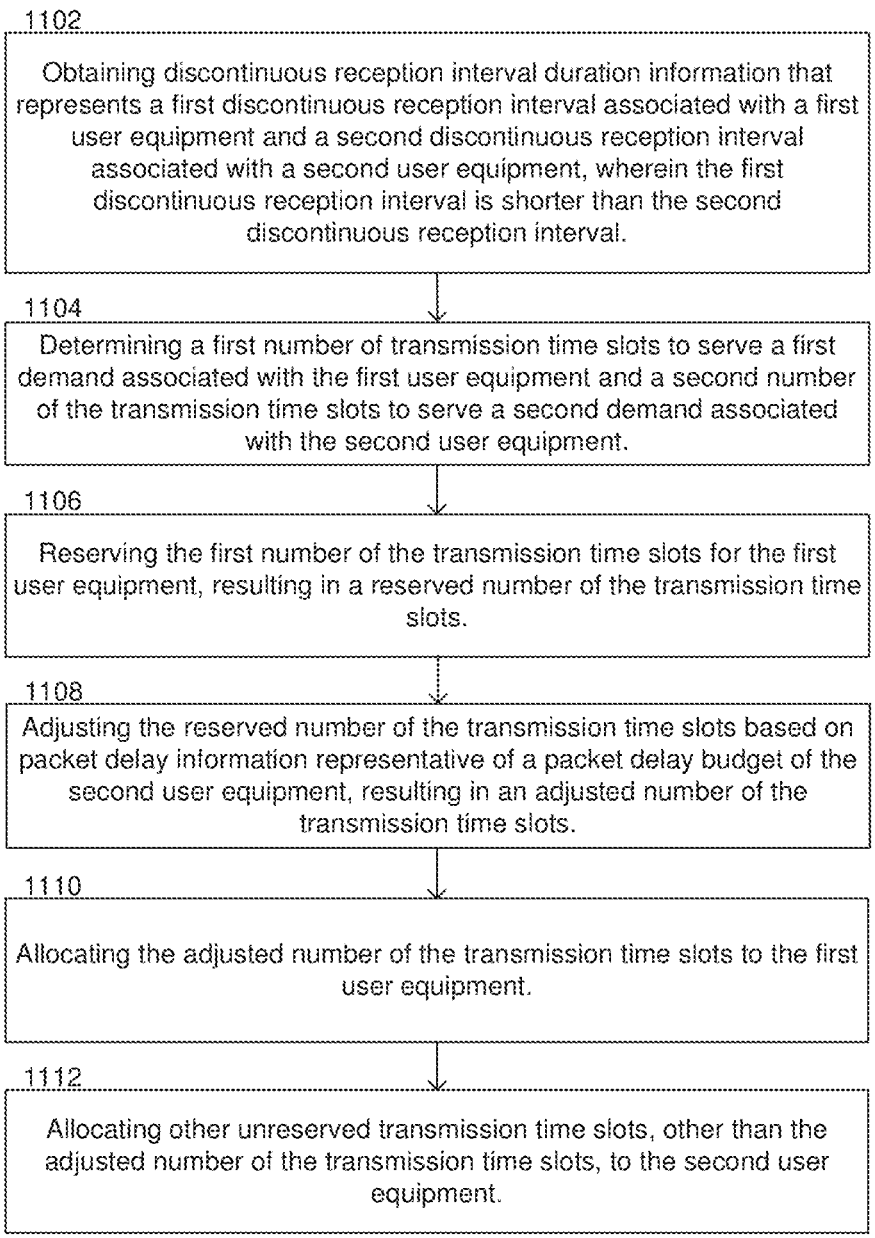
FIG. 11 is a flow diagram of a third example, non-limiting computer implemented method for allocating resources to UEs based on UE energy constraints as demonstrated by UE DRX intervals, in accordance with one or more embodiments described herein.

FIG. 11 is a flow diagram of a third example, non-limiting computer implemented method for allocating resources to UEs based on UE energy constraints as demonstrated by UE DRX intervals, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 11 can be performed by network equipment comprising a controller 200 such as illustrated in FIG. 2. Operation 1102 comprises obtaining discontinuous reception interval duration information that represents a first discontinuous reception interval 310 associated with a first user equipment 220 and a second discontinuous reception interval 320 associated with a second user equipment 230, wherein the first discontinuous reception interval 310 is shorter than the second discontinuous reception interval 320. The discontinuous reception interval duration information can optionally further comprise discontinuous reception interval offset information, which can be used to determine overlap of the discontinuous reception intervals 310, 320.

Operation 1104 comprises determining a first number of transmission time slots 331-340 to serve a first demand associated with the first user equipment and a second number of the transmission time slots 331-340 to serve a second demand associated with the second user equipment. For example, the controller 200 can determine a scheduling option such as scheduling option 360. The first demand associated with the first user equipment 220 can optionally be determined based on an uplink buffer size reported by the first user equipment 220, or for example an uplink channel spectral efficiency associated with the first user equipment 220.

Operation 1106 comprises reserving the first number of the transmission time slots 331-340 for the first user equipment 220, resulting in a reserved number of the transmission time slots 331-340. Operation 1108 comprises adjusting the reserved number of the transmission time slots 331-340 based on packet delay information representative of a packet delay budget of the second user equipment 230, resulting in an adjusted number of the transmission time slots 331-340. In an embodiment, the packet delay information representative of the packet delay budget can be second packet delay information representative of a second packet delay budget, and adjusting the reserved number of the transmission time slots can optionally be further based on first packet delay information representative of a first packet delay budget of the first user equipment 220.

Operation 1110 comprises allocating the adjusted number of the transmission time slots to the first user equipment 220, and operation 1112 comprises allocating other unreserved transmission time slots, other than the adjusted number of the transmission time slots, to the second user equipment 230. For example, the controller 200 can send resource allocation data 211 to the network node 210 to enable the network node to allocate the adjusted number of the transmission time slots to the first user equipment 220 and the other unreserved transmission time slots to the second user equipment 230, according to the resource allocation data 211.

Figure 12:
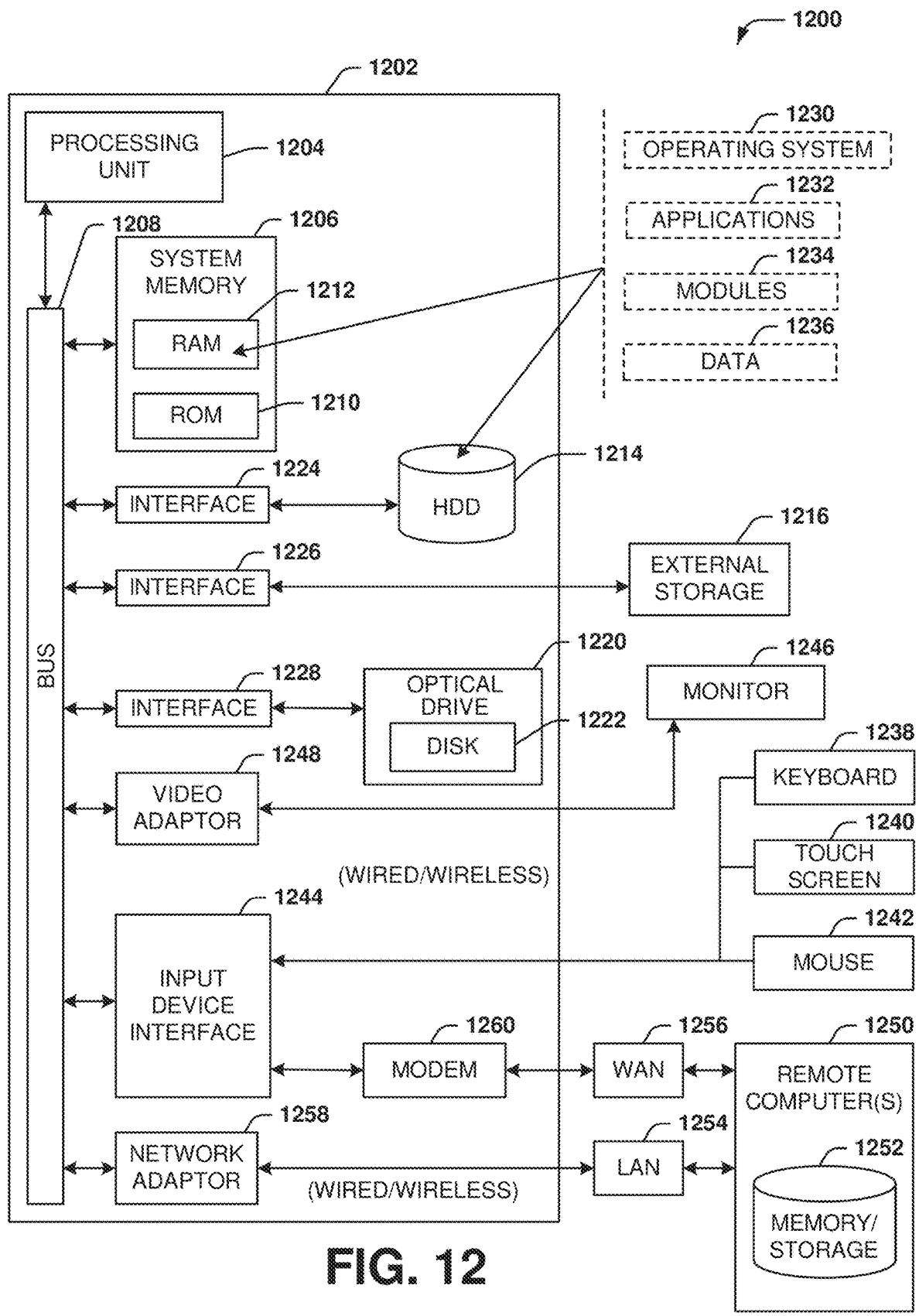
FIG. 12 illustrates a block diagram of an example computer operable to provide any of the various devices described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown).

Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

obtaining, by network equipment comprising at least one processor, first discontinuous reception interval duration information that represents a first duration of a first discontinuous reception interval used by a first user equipment;

obtaining, by the network equipment, second discontinuous reception interval duration information that represents a second duration of a second discontinuous reception interval used by a second user equipment, wherein the second discontinuous reception interval overlaps the first discontinuous reception interval; and in response to the first discontinuous reception interval duration being determined to be shorter than the second discontinuous reception interval duration, prioritizing, by the network equipment, first allocations of transmission time slots during the first discontinuous reception interval to the first user equipment to have a higher priority than second allocations of the transmission time slots during the first discontinuous reception interval to the second user equipment, wherein the prioritizing results in a prioritized allocation; and using, by the network equipment, the prioritized allocation to configure network transmissions via a network comprising the network equipment, wherein the prioritized allocation is based at least in part on a data volume of data transmitted via the first user equipment, and wherein the data volume comprises an uplink data volume of uplink data transmitted from the first user equipment via the network.

2. The method of claim 1, wherein the prioritized allocation allocates all of the transmission time slots during the first discontinuous reception interval to the first user equipment.

3. The method of claim 1, wherein the prioritized allocation comprises a reduced allocation of the transmission time slots during the first discontinuous reception interval to the first user equipment, and wherein the reduced allocation is reduced based on a packet delay budget associated with the second user equipment.

4. The method of claim 1, further comprising determining, by the network equipment, the data volume based on an amount of data in a buffer used by the first user equipment.

5. The method of claim 1, wherein the prioritized allocation is based at least in part on channel spectral efficiency data representative of a channel spectral efficiency associated with the first user equipment.

6. The method of claim 1, wherein the network equipment comprises a radio access network intelligent controller.

7. The method of claim 1, wherein the first discontinuous reception interval comprises an uplink discontinuous reception interval.

8. Network equipment, comprising:
at least one processor; and
at least one memory that stores executable instructions that, when executed by the at least one processor, facilitate performance of operations, comprising:
selecting a first user equipment from a group of user equipment, wherein the first user equipment is associated with a first discontinuous reception interval comprising a first number of transmission time slots, wherein the first number of transmission time slots is lower than a second number of transmission time slots in at least one second discontinuous reception interval associated with at least one second user equipment of the group of user equipment;
reserving a group of transmission time slots for allocation to the first user equipment, resulting in a reserved group of transmission time slots;
in response to a determination that the reserved group of transmission time slots results in exceeding a packet delay budget of the at least one second user equipment, reducing the reserved group of transmission time slots, resulting in a reduced reserved group of transmission time slots;
allocating the reduced reserved group of transmission time slots to the first user equipment; and
allocating other transmission time slots, other than the reduced reserved group of transmission time slots, to the at least one second user equipment.

9. The network equipment of claim 8, wherein a size of the reserved group of the transmission time slots is based on a buffer size of a buffer associated with the first user equipment.

10. The network equipment of claim 8, wherein a size of the reserved group of the transmission time slots is based on a channel spectral efficiency associated with a modulation and coding scheme used by the first user equipment.

11. The network equipment of claim 8, wherein a size of the reserved group of the transmission time slots is based on a total available bandwidth associated with transmissions between the first user equipment and at least one network device of a network comprising the network equipment.

12. The network equipment of claim 8, wherein the first discontinuous reception interval comprises an uplink discontinuous reception interval.

13. The network equipment of claim 8, wherein a third number of transmission time slots in at least one third discontinuous reception interval associated with at least one third user equipment of the group of user equipment is lower than the second number of transmission time slots, wherein the other transmission time slots comprise first other transmission time slots, and wherein the operations further comprise:
in response in response to a determination that the reserved group of transmission time slots results in exceeding a packet delay budget of the at least one third user equipment, reducing the reserved group of transmission time slots, resulting in the reduced reserved group of transmission time slots; and
allocating second other transmission time slots, other than the reduced reserved group of transmission time slots and the first other transmission time slots, to the at least one third user equipment.

14. The network equipment of claim 8, wherein the network equipment comprises a radio access network intelligent controller.

15. A non-transitory machine-readable medium, comprising executable instructions that, when executed by at least one processor, facilitate performance of operations, comprising:
obtaining discontinuous reception interval duration information that represents a first discontinuous reception interval associated with a first user equipment and a second discontinuous reception interval associated with a second user equipment, wherein the first discontinuous reception interval is shorter than the second discontinuous reception interval;
determining a first number of transmission time slots to serve a first demand associated with the first user equipment and a second number of the transmission time slots to serve a second demand associated with the second user equipment;
reserving the first number of the transmission time slots for the first user equipment, resulting in a reserved number of the transmission time slots;
adjusting the reserved number of the transmission time slots based on packet delay information representative of a packet delay budget of the second user equipment, resulting in an adjusted number of the transmission time slots; and
allocating the adjusted number of the transmission time slots to the first user equipment.

16. The non-transitory machine-readable medium of claim 15, wherein the first demand associated with the first user equipment is determined based on an uplink buffer size reported by the first user equipment.

17. The non-transitory machine-readable medium of claim 15, wherein the first demand associated with the first user equipment is determined based on an uplink channel spectral efficiency associated with the first user equipment.

18. The non-transitory machine-readable medium of claim 15, wherein the packet delay information representative of the packet delay budget is second packet delay information representative of a second packet delay budget, and wherein adjusting the reserved number of the transmission time slots is further based on first packet delay information representative of a first packet delay budget of the first user equipment.

19. The non-transitory machine-readable medium of claim 15, wherein the discontinuous reception interval duration information comprises discontinuous reception interval offset information.

20. The non-transitory machine-readable medium of claim 15, wherein the operations further comprise:
   allocating other unreserved transmission time slots, other than the adjusted number of the transmission time slots, to the second user equipment.

\* \* \* \* \*